United States Patent [19]

Riley

[11] Patent Number: 4,718,229
[45] Date of Patent: Jan. 12, 1988

[54] FAILSAFE ELECTRONIC CONTROL SYSTEMS

[75] Inventor: Paul H. Riley, Derby, England

[73] Assignee: Rolls-Royce plc, London, England

[21] Appl. No.: 913,364

[22] Filed: Sep. 30, 1986

[30] Foreign Application Priority Data

Oct. 30, 1985 [GB] United Kingdom ............. 8526726

[51] Int. Cl.⁴ .................................................. F02C 1/28
[52] U.S. Cl. ............................................... 60/39.281
[58] Field of Search ...................... 60/39.091, 39.281

[56] References Cited

U.S. PATENT DOCUMENTS

| | | | |
|---|---|---|---|
| 3,520,133 | 7/1970 | Loft et al. | 60/39.281 |
| 4,077,203 | 3/1978 | Burnell | 60/39.281 |
| 4,134,257 | 1/1979 | Riple | 60/39.281 |
| 4,248,040 | 2/1981 | Kast | 60/39.281 |
| 4,528,812 | 7/1985 | Cantwell | 60/39.281 |
| 4,578,945 | 4/1986 | Peck et al. | 60/39.281 |

*Primary Examiner*—Louis J. Casaregola

*Attorney, Agent, or Firm*—Cushman, Darby & Cushman

[57] ABSTRACT

For flight safety reasons in gas turbine aeroengines it is desireable that in the event of malfunction of an electronic control system—such as a fuel control system—caused, for example, by overheating due to fire, the control system should protect the engine and the aircraft against the consequences of such a malfunction. In the present invention this is achieved by arranging that the control system is provided with a failsafe unit which monitors the condition of the control system and puts the engine into a failsafe control mode if a control system condition signal generated by the failsafe unit varies beyond a predetermined limit. Thus, to ensure safety under overheating conditions, the control system condition signal is representative of the temperature experienced by the fuel control system and the failsafe control mode is a speed-limiting control mode. Specific control mode sequences and corresponding control unit takeover ranges and constructions are disclosed which are effective to ensure that any control system failures have safe predictable results.

9 Claims, 5 Drawing Figures

FAILSAFE ELECTRONIC CONTROL SYSTEMS

This invention relates to control systems for gas turbine aeroengines, and in particular to electronic control systems which ensure that in the event of component failure due to, for example, overheating caused by fire, they will fail in a way which as far as possible safeguards the mechanical integrity of the engines and the control of the aircraft in which they are installed.

In the unlikely event of a fire in or near a gas turbine engine, causing overheating of an electronic control system of the engine, it is important tha the control system should fail in a safe, predictable way. For example, a component failure which causes a fuel control system to allow a significantly higher fuel flow than is needed by the engine in its current condition, may lead to a catastrophic overspeed of the engine. Such an event is of particular concern in the case of an engine fitted with a FADEC (Full Authority Digital Electronic Control) system. In such a case, integrity of the engine is totally dependant on the correct functioning of the digital electronics, which control the various actuators on the engine directly. Hence, it is very important for the system to fail safe.

It is conventional to tackle this problem by simply arranging that if the temperature of a certain part of the engine climbs above a certain value indicating severe overheating which could imperil the integrity of the control system, and hence the engine, the control system—in the past, a hydromechanical/analogue electrical system—is disconnected from its power supply, so causing a valve in the fuel supply to be shut off so that normal control of the engine is overriden and the engine is starved of fuel and runs down. In fact the valve is driven against a step which leaves it sufficiently cracked open to maintain the fuel flow rate at a value which maintains a pilot flame in the combustion chamber, but which is insufficient to provide any significant power. In such prior proposals, any overspeed limiting control mode of which the control system is also capable is irrelevant to the question of control during overheating situations, since the overspeed limiting control mode is overridden along with the normal control mode.

In the past the means of sensing the temperature of the engine part has been a simple fusible link which melts when the limiting temperature is reached, so breaking a circuit connection and depowering the control system.

However, current safety considerations may render such proposals inadequate for FADEC systems, in that fusible links do not have adequate mechanical integrity to match the reliability of modern electronic systems; also it is not enough merely to prevent upward runaway of engine speed by causing a valve to close when engine overheating occurs, because this automatic shut down of the engine makes control of the aircraft more difficult. Instead, the digital electronic control system should remain in control of the engine for as long as possible during a fire until a control system component failure prevents it from doing so, whereupon there must not be an upward runaway of engine speed.

The present invention contributes to the solution of the above problems by providing control systems the control modes of which are selectively superceded according to conditions experienced by the engine or the control system.

In its widest aspect, the invention provides a failsafe control system for a gas turbine aeroengine, comprising at least one control means for exercising at least one control mode over the engine in response to engine condition signals wherein the control system is further provided with means for monitoring the condition of the control system as represented by at least one control system condition signal, and a failsafe control means for putting the engine into a failsafe control mode in the event that the at least one control system condition signal varies beyond a predetermined limit. For example, to address the above-described overheating problem, the control system condition signal would be representative of the temperature being experienced by the fuel control system and the failsafe control mode would be a speed-limiting control mode. However, for other embodiments we envisage that the condition signal(s) could be, for example, one or more output signals of the control system or its compoents, whose variation beyond expected ranges would signal the probability of a malfunction.

The invention similarly but more specifically provides a failsafe control system for a gas turbine aeroengine, comprising:

(a) a first control means for exercising a first control mode over the engine in response to engine condition signals; and (b) a second control means for exercising a second control mode over the engine in response to at least one engine condition signal, the arrangement being such that the second control means takes over control of the engine from the first control means whenever the at least one engine condition signal varies beyond a predetermined limit and retains such control until the at least one engine condition signal comes back within the predetermined limit; wherein the control system is further provided with means for monitoring the condition of the control system as represented by at least one control system condition signal and a fail safe control means for putting the engine into a failsafe control mode by overriding the first and second control means if the at least one control system condition signal varies beyond a predetermined limit.

According to a specific aspect of the present invention, a fuel control system for a gas turbine aeroengine includes:

(a) means for sensing the rotational speed of the engine and producing a speed signal representative thereof, (b) fuel flow metering means for metering the fuel flow to the engine, (c) first, electronic, control means operative in conjunction with the fuel flow metering means to exercise a first and normal control mode over fuel flow to the engine, and (d) second, electronic, control means operative in conjunction with the fuel flow metering means to exercise a second and speed limiting control mode over fuel flow to the engine in response to said speed signal, the arrangement being such that the second control means takes over control of fuel flow from the first control means whenever the speed signal exceeds a predetermined value indicating overspeed and retains such control until the speed signal falls below the predetermined value; wherein the fuel control system is adapted to prevent overspeed of the engine due to failure of electronic components when the fuel control system is subjected to higher than normal operating temperatures, the control system further including means for sensing the temperature of the control system and producing a temperature signal representative thereof, and a third control means operative to exercise a third and speed limiting failsafe control mode over fuel flow to the engine in response to said temperature signal, the third control means being adapted to irreversibly take over control of fuel flow from the first and second control means if the temperature of the control system exceeds a predetermined value indicative of likely failure of the first and second control means.

According to a further aspect of the present invention, a fuel control system for a gas turbine aeroengine includes:

(a) first, electronic, control means for generating a first fuel flow control signal for maintaining a normal control mode of the engine, (b) second, electronic, control means for generating a second fuel flow control signal for preventing overspeed of the engine when the first fuel flow control signal fails to prevent such overspeed, and (c) fuel flow metering means for metering the fuel flow to the engine in response to the first and second fuel flow control signals; wherein the fuel control system further includes speed-limiting failsafe control system and take over control of the fuel flow from the first and second electronic control means if the temperature exceeds a predetermined dangerous value.

The third control means mentioned above may comprise temperature-controlled electronic switching means and fuel flow restriction means, the electronic switching means being arranged to remove control of fuel flow from the first and second control means when the temperature of the control system exceeds said predetermined value and the fuel flow restriction means being adapted automatically to restrict the fuel flow to a low flow rate when said removal of control occurs, said low flow rate preventing overspeed of the engine from occuring at any condition of the engine.

Preferably, the electronic switching means may comprise:

temperature sensing means for generating a sensed temperature signal expressive of the temperature experienced by the switching means;

temperature datum means for generating a datum temperature signal expressive of said predetermined value of temperature;

comparator means for comparing the sensed temperature signal with the datum temperature signal and outputting a switching signal when the sensed temperature signal exceeds the datum temperature signal; and a semiconductor switching device connected to remove control of the fuel flow metering means from at least the first control means.

The above fuel flow restriction means may comprise spring bias means, valve means and associated valve stop means in the fuel flow metering means, the position of said valve means normally being controlled by the first electronic control means to control the flow through the fuel flow metering means, whereby when the electronic switching means removes control of said valve means from the first electronic control means, said valve means is automatically moved against said valve stop means by the spring bias means to establish said low flow rate.

The above-mentioned first control means preferably comprises a digital electronic controller for excerising a normal control mode comprising full authority digital control of the engine.

Preferably, the second control means causes valve means in the fuel flow metering means to substantially cut off the flow of fuel to the engine when the engine overspeeds, the flow of fuel remaining substantially cut off until the engine speed falls below a predetermined safe value. In this way, control remains with the normal control mode except during overspeeds.

Preferably, the first control means comprises components rated at a first (lower) peak operating temperature and the second and third control means comprise components rated at a second (higher) peak operating temperature, the above-mentioned predetermined value of temperature being slightly less than the second peak operating temperature. Such an arrangement gives the most reliable sequence of control as temperatures rise in the control system.

Other aspects of the invention will be apparent from a reading of the following description and the claims.

An embodiment of the invention will now be described, by way of example only, with reference to the accompanying drawings, in which.

Figure 1:
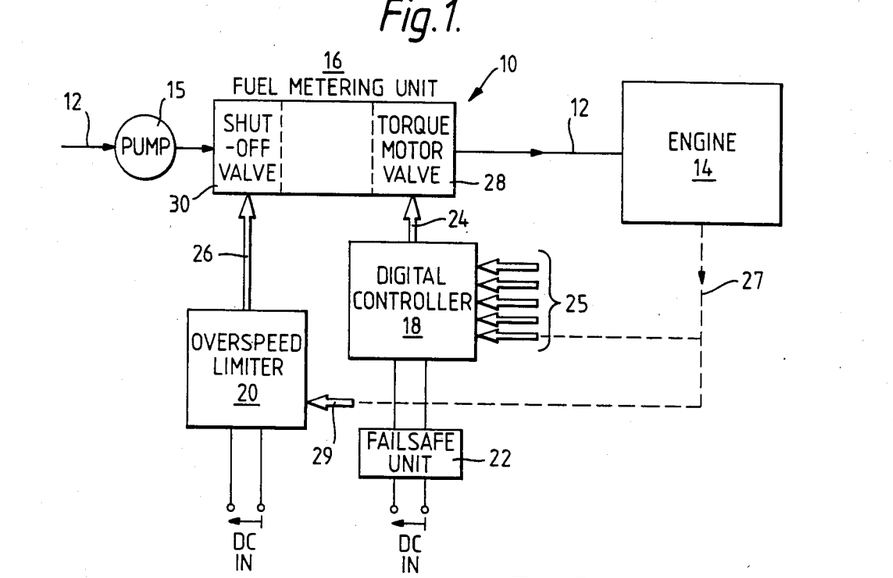
FIG. 1 is a simplified block diagram illustrating a gas turbine engine fuel control system incorporating the invention.

Referring to FIG. 1, a simplified control system 10 is shown controlling fuel flow 12 to a gas turbine aeroengine 14. The control system 10 can be regarded as comprising various units including a mechanical fuel pump 15, an electro-mechanical fuel flow metering unit 16, a digital electronic controller 18, an electronic overspeed limiter 20, and a so-called "failsafe unit" 22 which constitutes an essential part of the present invention, along with aspects of the character of the limiter unit 20. The failsafe unit 22 is coupled across the DC power input to the digital control module 18, its purpose being to de-power the control unit 16 under conditions in which dangerous overheating of the control system's electronic components occurs. Although not indicated in the drawings, the control system 10 would in reality be located on or adjacent the outer casings of engine 14.

Apart from certain features which will be explained in relation to limiter 20 and failsafe unit 22, and the consequent modified operation on the control system, the construction and operation of the various elements of control system 10 is known from the prior art and will therefore not be described in detail. In general terms, the fuel pump 15 pumps fuel 12 to engine 14 at a rate which is normally entirely controlled by input 24 to the fuel metering unit 16 from the digital controller 18. As known in the industry, controller 18 preferably comprises two or three identical control units and a self-monitoring system of some sort in order to maintain a reliable input 24 should any one of the individual control units fail in service. Controller 18 accepts various analogue signal inputs 25 from engine 14 and the aircraft, conditions them, and by means of appropriately programmed micro-processors, applies control alogrithms to them (as known in the industry), finally producing an analogue output signal 24. Signal 24 drives a torque motor valve 28 within fuel metering unit 16, in which an electronic torque motor serves to open a spring-loaded valve in the fuel line against the action of the spring, the amount of opening of the valve depending upon the strength of the signal 24. Such torque motor valves are well known in the industry.

One of the inputs 25 to the digital controller 18 is a tachometer frequency signal 27 representing the shaft speed of the engine 14 in Hertz. Shaft speed must be limited to a certain maximum in order to ensure the integrity of the engine against mechanical failure due to excessive centrifugally induced stresses. Normally, the digital controller 18 acts (through valve 28) to control shaft speed by trimming the fuel flow 12. It may also influence shaft speed by producing further command signals (not shown, but in different channels to that of control signal 24) which open bleed valves and/or alter the angles of variable inlet guide vanes in the compressor of engine 14, but these aspects are ignored for the purposes of the present invention.

The shaft speed signal 27 also forms the input 29 to the overspeed limiter 20, whose function is to prevent the shaft speed rising above the allowed maximum value in the event of failure of the digital controller 18 to prevent such overspeeding. In the present case the overspeed limiter is an electronic analogue unit which monitors the signal 27 and if its frequency is greater than the maximum allowed value, produces a control signal 26. This is fed to a solenoid-operated shut-off valve 30 in fuel metering unit 16. Normally the valve 30 is spring-biased to the open position but when the solenoid is energised by signal 26 the valve is forced almost shut against the spring bias to reduce the flow of fuel 12 to the engine to a minimal level until such time as the shaft speed falls below the maximum allowable value set by the limiter 20. In this way the overspeed limiter 20 effectively takes over control of the fuel flow from the digital controller 18. When the engine shaft speed falls sufficiently due to fuel starvation, the control signal 26 returns to zero value, the solenoid is depowered, and the valve 30 opens fully to allow fuel 12 through to the engine 14 again until such time as the shaft speed becomes too great again. This cycle will continue until the digital controller 18 reasserts its complete control over fuel flow 12, or the pilot can compensate for defective automatic control by manual adjustments, or—in the case of an electronic failure in the digital controller 18 caused by excessively high temperatures—the temperature of the control system 10 rises to such a level as to imperil the operational status of limiter 20, in which case the failsafe unit 22 operates to depower the faulty digital controller 18 as previously mentioned and ensure changeover to a failsafe mode which ensures that the fuel flow 12 is held to a low flow rate which cannot in any circumstances cause the engine to overspeed. This control sequence meets the requirements of current airworthiness regulations which state that in the event of a fire in or near an aeroengine, the fire must not be able to cause a hazardous engine condition to occur. This means that a fire must not cause the control system to shut down the engine automatically, and the control system must control the engine during the fire until a failure prevents it from doing so, whereupon there must not be an upward runaway of engine speed.

The design of control system 10, in respect of those aspects which relate to the above safety considerations, will now be discussed in more detail.

Figure 2:
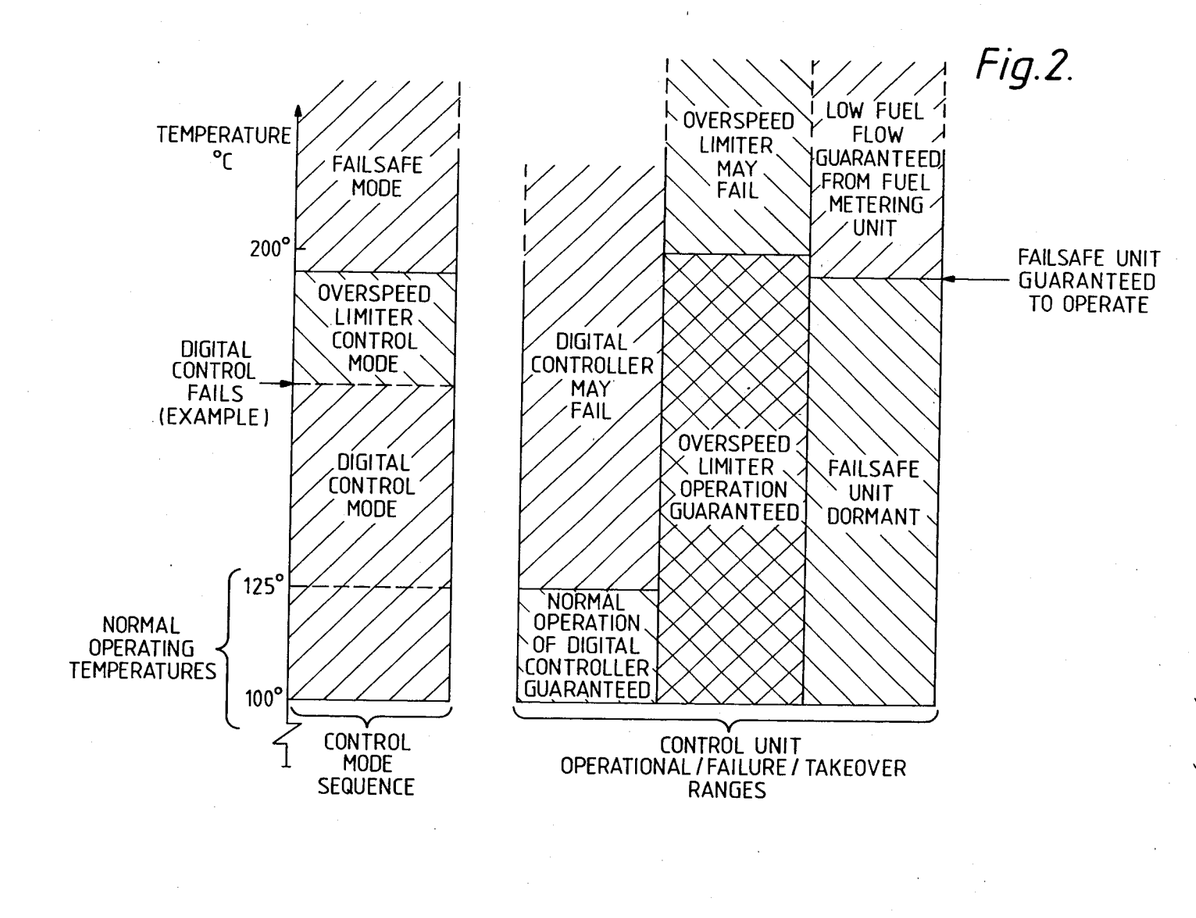
FIG. 2 is a graphical representation of the control events which occur in the control system of FIG. 1 as the temperature of the control system increases.

FIG. 2 is a bar-graph plot of rising temperature in ° C. against the control event sequences which are built into the control system shown in FIG. 1. Looking at the right hand part of FIG. 2, it will be seen that normal operation of components in the digital controller 18 is "guaranteed" up to a working temperature of 125° C. At higher temperatures there is an exponential increase in the probability of component failure as temperatures rise. This is because the digital controller 18 incorporates readily available electronic components which are rated at a peak operating remperature of 125° C., which is the normal rating for electronic components for use in aircraft systems.

Figure 5:
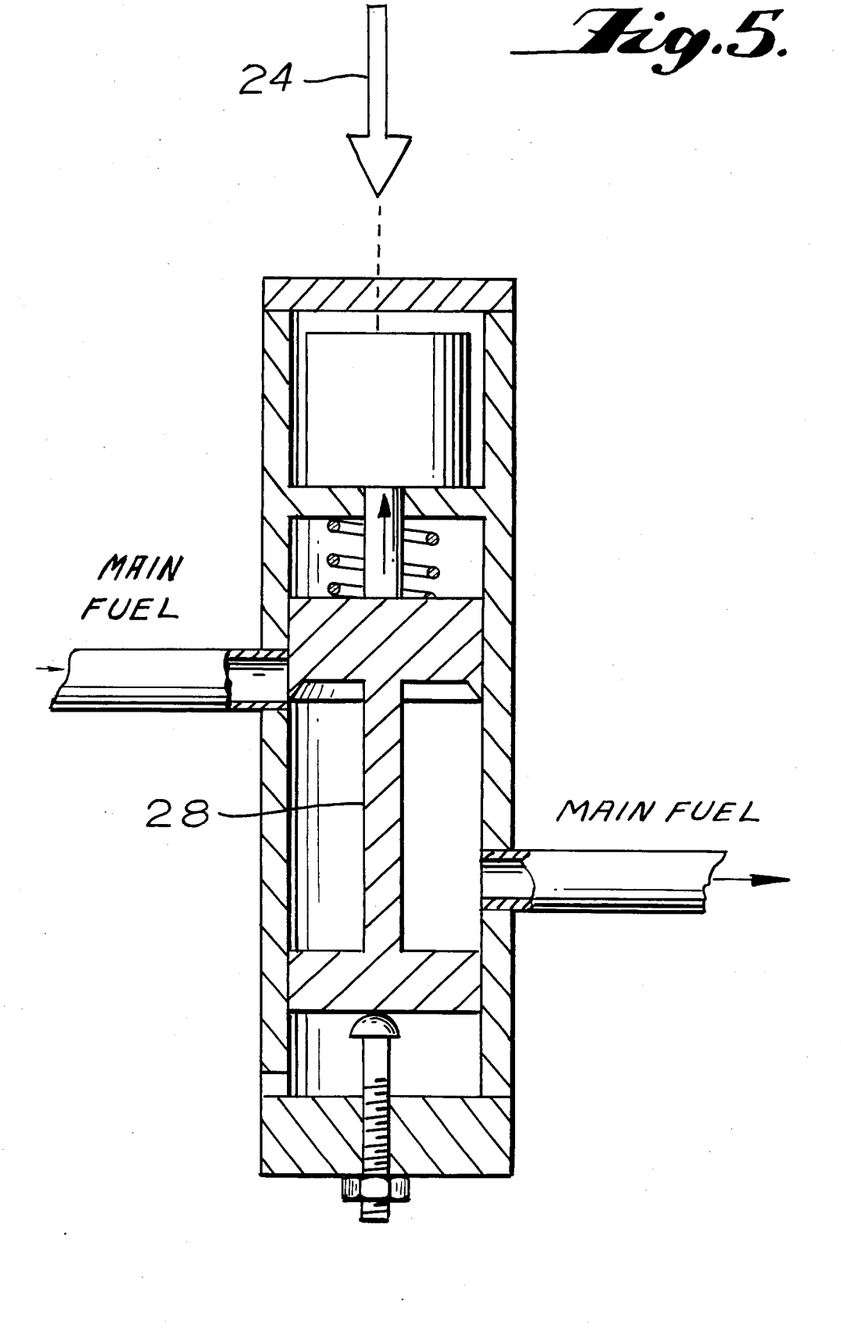
FIG. 5 is a sectional schematic illustration of the torque motor valve.

If overheating of digital controller 18 does occur there is a possibility that failure of an electronic component will result in the digital controller giving a signal 24 which sets the torquemotor valve 28 to allow a significantly higher fuel flow than is needed by the engine 14 in its current condition. FIG. 5 illustrates one management of the torque valve motor of the present invention. It is therefore necessary to ensure that in such a case as the fuel metering unit 16 does not allow the fuel pump 15 to overfuel engine 14 and thereby cause a catastrophic overspeed of the engine. This is one reason that the overspeed limiter 20 monitors the engine shaft speed signal 27 and temporarily closes the shut-off valve 30 as described previously until the speed has dropped sufficiently. In contrast to the digital controller 18, FIG. 2 shows that the reliable operation of overspeed limiter 20 is guaranteed to a much higher temperature, namely 200° C. This means that the electronic components used in overspeed limiter 20 are rated at a peak operating temperature of 200° C. so that they have a very much higher reliability at operating temperatures of from 125° C. to in excess of 200° C. than the normally rated components used in digital controller 18. Hence, there is an extremely high probability that in the event of a failure in digital controller 18 which would otherwise cause overspeed of engine 14, adequate control of engine speed will be maintained through the operation of the overspeed limiter 20.

There remains the possibility that a serious engine fire could cause the temperature of the components in overspeed limiter 20 to exceed their peak operating temperature rating of 200° C., thereby making it much more likely that one of these components will fail, causing deficient operation or non-operation of the shut-off valve 30. This again could lead to overspeed of the engine, posing a hazard to the aircraft.

It will be seen from FIG. 2 that to cope with this exigency the failsafe unit 22, which is inoperative (i.e. dormant) at lower temperatures, is guaranteed to operate at 195° C. (i.e. 5° C. below the peak operating temperature of overspeed limiter 20) thereby setting the drive circuitry of the digital controller 18 to zero volts and cutting off signal 24. This results in the fuel metering unit reducing the fuel flow 12 to the low value which will prevent overspeeding of engine 14 under all operating conditions. This low fuel flow through the fuel metering unit is attained by the simple expedient of arranging that if the torque motor is rendered inoperative due to removal of signal 24, the spring bias previously mentioned forces the valve 28 back against a stop as illustrated in FIG. 5, which leaves the valve open by an appropriate amount.

The above described arrangement produces a control system 10 with three control modes with respect to overheating/overspeeding situations, as shown on the left hand side of FIG. 2. At normal operating temperatures, up to 125° C., it is guaranteed, to very high levels of probability, that the digital control mode, exercised through digital controller 18, will retain full control over the fuel flow 12. At temperatures above 125° C. it is not possible to provide a guaranteed reliability rating for digital controller 18, but the control system 10 will nevertheless remain in the digital mode until a failure in digital controller 18 causes an upward runaway in engine speed and control is taken over by the overspeed limiter 20. At temperatures under 200° C. it is guranteed, again to very high levels of probability, that the overspeed limiter control mode will take control of the fuel flow 12 for the purpose of preventing engine overspeeds. At temperatures above 200° C. it is not possible to provide a guranteed reliability rating for overspeed limiter 20, so to guard against catastrophic overspeed in the event of a failure in the overspeed limiter, the failsafe unit operates automatically at 195° C. to put the control system 10 into its failsafe mode, giving a fixed low fuel flow through valve 28 from the fuel metering unit 16.

From the pilot's point of view, "worst case" failures of the digital controller 18 will result either in inability of the pilot to control thrust adequately, or in too large a fuel flow to the engine. In the former case the pilot has the option of shutting down the engine when control becomes unacceptable. This conforms with airworthiness authorities' rules. In the latter case the overspeed limiter modes of operation protect the engine as described above.

In this way components of a higher than normal temperature rating are used to protect the engine against failure of the standard temperature rating components.

Figure 3:
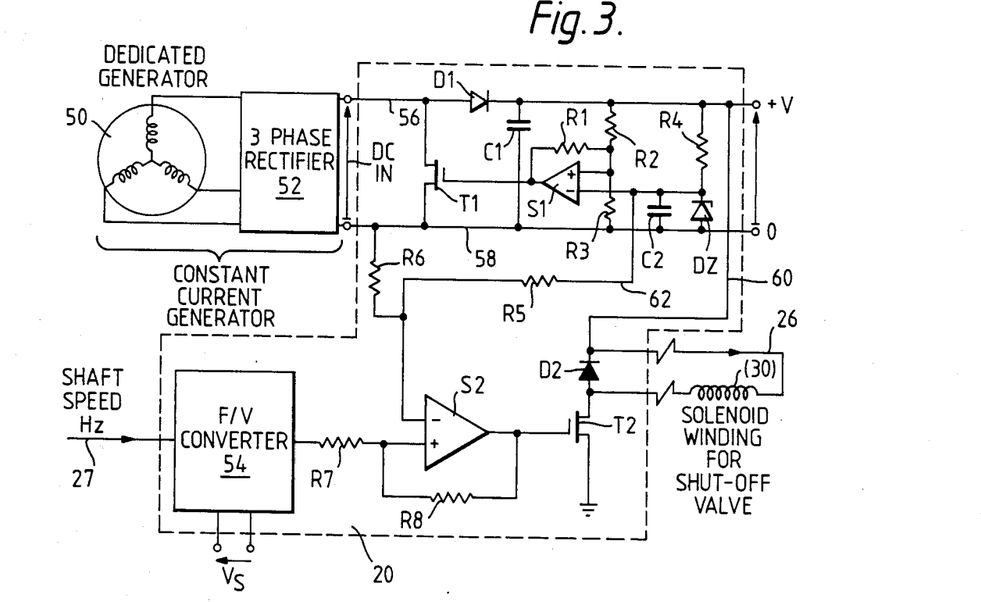
FIGS. 3 and 4 are circuit diagrams of specific circuit configurations for two of the control units in the fuel control system of FIG. 1.

FIG. 3 shows one example of how the overspeed limiter 20 could be implemented in practice. The components of limiter 20 are shown within the dashed lines and all can be procured to withstand operation at 200° C. Limiter 20 is powered from a dedicated generator of three phase alternating current on the engine 14. This is converted to d.c. by the three phase rectifier 52, the generator 50 and rectifier 52 together comprising a constant current generator which feeds the input terminals of limiter 20. However, the voltage supplied to the limiter 20 by rectifier 52 can vary.

In the limiter 20, the items T1, D1, C1, R1, S1, R2, R3, R4, C2 and DZ form a switch mode shunt regulator as known to the average specialist. The purpose of the regulator is to feed a substantially constant voltage to a fuel-chop type of limiter, which consists of items R5, R6, R7, R8, S2, D2, T2 and the frequency-voltage converter 54, again as known to the average specialist.

In more detail, capacitors C1 and C2 help to smooth voltage fluctuations and Zener diode DZ is acting as a voltage stabiliser. Diode D1 is acting to protect MOSFET T1 against back emf coming from other parts of the limiter 20 and prevents C1 from discharging. Resistors R2 and R3 act as potential dividers to determine the voltage fed to the non-inverting input of an operational amplifier in the form of a Schmitt trigger S1, and resistor R4 provides a constant proportion of voltage V in common rail 56 to the inverting input of S1. Resistor R1 determines the hysterisis of the Schmitt trigger S1, which acts as a level detector. Its output is either high or low, thereby setting the gate of MOSFET T1 either to high potential or low potential respectively. With its gate at a low potential T1 conducts very little current between common rails 56 and 58 but when the gate is high T1 acts virtually as a short-circuit between the two rails. Hence, T1 acts as a shunt controlled to the on or off state by S1, which monitors the fluctuations in the voltage V on common rail 56 relative to the zero potential on common rail 58. If the voltage V goes above a predetermined value, the potential difference between the inputs of S1 becomes greater than about two volts and T1 temporarily shunts the voltage across the output of the rectifier 52 until V has declined sufficiently to switch T1 off. This of course happens very rapidly, being repeated as necessary to maintain a substantially constant voltage supply on lines 60 and 62 to the fuel limiter circuit arrangement.

In the fuel limiter circuit arrangement forming the other part of limiter 20, the shaft speed signal 27 is fed to a frequency-to-voltage converter 54 to result in a positive output voltage which varies with shaft speed. After attenuation in resistor R7, the variable voltage is fed to the non-inverting input of an operational amplifier in the form of a Schmitt trigger S2 whose hysteresis is determined by the value of resistor R8. The hysteresis represents a small range of engine speed, the maximum allowable sustained engine speed being the top of the range. The inverting input of S2 is tied to the potential of the low input of S1 as attenuated by resistor R5 and as pulled further down towards the zero potential of common rail 58 through resistor R6. When the potential difference between the inverting and non-inverting inputs of 52 exceeds about 2 volts, its output is switched on, so putting a positive voltage onto the gate of MOSFET T2; this component controls the current flowing through the solenoid winding of the shut-off valve 30, the current being the signal 26 shown in FIG. 1. D2 is present merely to prevent T2 being damaged by back-e.m.f. from the solenoid winding. Normally, with the gate of T2 being at a low potential, insufficient drain current flows through the substrate of T2 to energise the solenoid adequately to operate the shut-off valve. However, when the engine shaft speed signal 27 increases beyond the allowed maximum, the potential difference between the inputs of S2 becomes large enough to switch the output of S2, and therefore the gate of T2, to the high potential. This allows sufficient drain current to flow in T2 to operate the shut-off valve, which remains shut until the engine speed drops to the lower level set by the hysteresis of S2.

From the above it will be seen that only a relatively small number of simple but highly rated components are required in the construction of limiter 20. Consequently, its reliability at temperatures under 200° C. is very high.

Figure 4:
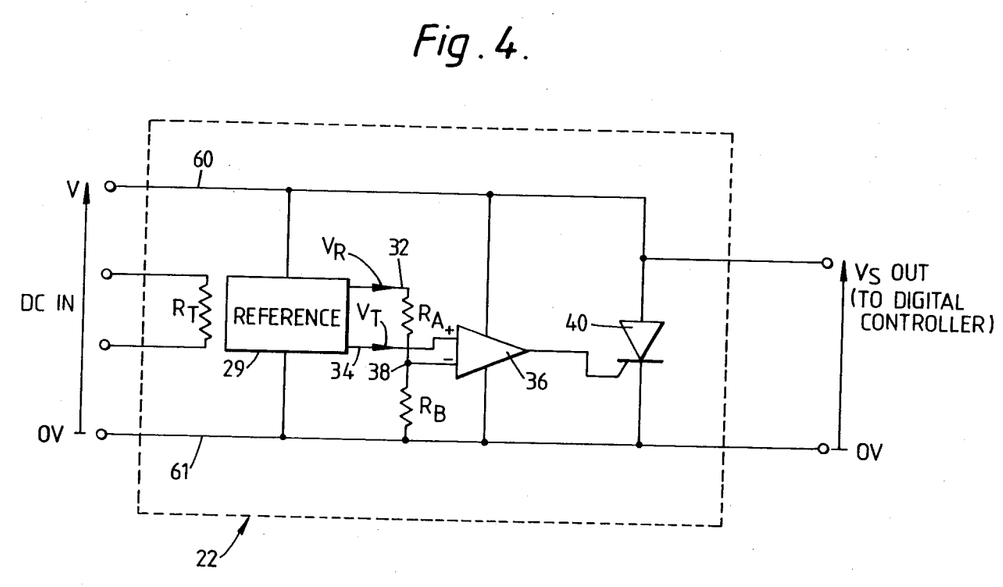

Turning now to the detailed construction of failsafe unit 22 as shown in FIG. 4, it is again noted that only a small number of highly rated (200° C.) components are required in its construction, again giving a very high reliability rating, of the order of 0.4 failures per million hours. The failsafe unit 22 is basically a temperature-controlled switch, comprising the components shown within the envelope of dashed lines. Other combinations of components are possible, and the circuit arrangement of FIG. 4 is therefore purely exemplary. The unit 22 as whole is connected across the DC power input lines 60 and 61, the components being in parallel with each other, strung between lines 60 and 61.

The failsafe unit 22 includes a reference voltage device 29 which is connected across the DC supply voltage input $V_S$ on lines 60 and 61 and produces its outputs on lines 32 and 34, these being respectively a reference voltage $V_R$ and a voltage $V_T$ which varies in accordance with the temperature experienced by the device. The reference voltage $V_R$ on line 32 is brought down to the common rail 61 through two resistors $R_A$ and $R_B$.

An operational amplifier in the form of a Schmitt trigger 36 is also powered from the supply voltage, and as indicated its inverting and non-inverting inputs are connected so that it acts as a zero crossing detector, comparing the voltage $V_T$ on line 34 with the voltage at the point 38 between the two resistors $R_A$ and $R_B$. The values of $R_A$ and $R_B$ are chosen so that point 38 is at the same voltage as $V_T$ is when the temperature being experienced by device 29 is 195° C., i.e. slightly less than the peak operational temperature of 200° C. for the components in the units 20 and 22. The output of operational amplifier 36 is connected to the gate of a thyristor 40 which again is connected for power across the power supply in parallel with reference device 29 and operational amplifier 36. The thyristor 40 will not conduct until a current pulse from the operational amplifier output flows in the gate circuit, and there will be no current pulse from the operational amplifier unless $V_T$ climbs above the value of the reference voltage at point 38. However, once the thyristor has been triggered, it will of course continue to conduct until the current through it falls below its threshold level. Hence, as soon as the thyristor is triggered, it short circuits the power to the digital controller 18, and the power supply stays short-circuited in this way for as long as $V_S$ is present on lines 60 and 61.

Suitable proprietary components for constructing units 20 and 22 are readily available. For example, in FIG. 4, reference voltage device 29 may be an integrated circuit known as REF2 produced by Precision Monolithios Incorporated of Santa Clara, Calif., U.S.A. This component can cope with supply voltages of between 7 and 40 volts. It gives a stabilised reference voltage output $V_R$ of 5 volts and an output $V_T$ which varies linearly with absolute temperature. It will operate reliably at temperatures of up to 230° C. in the circuit shown.

A suitable operational amplifier 36 is produced by Harris Corporation of Melbourne, Fl. under the designation HA 2600. It has a maximum rating of 200° C., but will operate reliably to 230° in this circuit.

Almost any thyristor 40 of the required current rating will do to complete the failsafe unit 22.

The unit 22 can be tested for correct functioning by applying current to a heating resistor $R_T$ which is physically close to the temperature sensing element in device 29. Because the object is to get the thyristor 40 to switch on, thereby disabling the control system, the test should be performed just before engine shut down.

Although the exemplary failsafe unit 22 of FIG. 4 is constructed so that if an overheat occurs, the power supply to the digital controller 18 is short-circuited, it is also within the ambit of the invention to construct an electronic switch which would cut off the power supply by producing an open circuit. As a further alternative, a switch could be constructed to send a signal to another component which would then initiate a safety condition.

Such switches as that shown in FIG. 4 or those mentioned immediately above can be set to trip or trigger at a wide range of temperatures to suit the particular circumstances of each case. Furthermore, whereas the emphasis in the present specification is directed to the failsafe unit being an electronic circuit arrangement, it should be recognised that it could be replaced by other means of depowering controller 18, such as bimetallic strips or fusible wires. However, such means are considered generally unsatisfactory because they have an unacceptably high failure rate, in excess of three per million operating hours.

Note that the circuit arrangements of FIGS. 3 and 4 can be encapsulated in one of the standard electronic packages, or custom manufactured integrally with an existing hybrid circuit or similar module. They can therefore be cheap, reliable, and compatible with existing manufacturing techniques.

Although the present invention's applicability to digital control systems has been emphasised, the invention should be understood to be applicable to analogue control systems also.

Whereas the specific example of a control system having three control modes, in respect of overheating and overspeeding situations, has been described above, this number should only be taken as exemplary; more than three are of course possible.

Although the invention has so far been specifically described as being for the purpose of preventing gas turbine aeroengine overspeeds due to heat-induced failure of electronic components in the fuel control system, the invention is thought to be broader than this in that it would be applicable to other sorts of control system and in that it would be possible to monitor indicators of possible or probable control system malfunction other than—or as well as—control system temperature, such as the output signals of such a control system or one or more of its individual components, so that any excursion of a signal beyond known suitable limits for the engine conditions being experienced would automatically invoke a failsafe control mode.

I claim:

1. A fuel control system for a gas turbine aeroengine, including:
    (a) means for sensing the rotational speed of the engine and producing a speed signal representative thereof,
    (b) fuel flow metering means for metering the fuel flow to the engine,
    (c) first, electronic, control means operative in conjunction with the fuel flow metering means to exercise a first and normal control mode over fuel flow to the engine, and
    (d) second, electronic, control means operative in conjunction with the fuel flow metering means to exercise a second and speed limiting control mode over fuel flow to the engine in response to said speed signal, the arrangement being such that the second control means takes over control of fuel flow from the first control means whenever the speed signal exceeds a predetermined value indicating overspeed and retains such control until the speed signal falls below the predetermined value; wherein the fuel control system is adapted to prevent overspeed of the engine due to failure of electronic components when the fuel control system is subjected to higher than normal operating temperatures, the control system further including means for sensing the temperature of the control system and producing a temperature signal representative thereof, and third control means operative to exercise a third and speed limiting failsafe control mode over fuel flow to the engine in response to said temperature signal, the third control means being adapted to irreversibly take over control of fuel flow from the first and second control means if the temperature of the control system exceeds a predetermined value indicative of likely failure of the first and second control means.

2. A fuel control system for a gas turbine aeroengine, including
   (a) first, electronic, control means for generating a first fuel flow control signal for maintaning a normal control mode of the engine,
   (b) second, electronic, control means for generating a second fuel flow control signal for preventing overspeed of the engine when said first fuel flow control signal fails to prevent such overspeed, and
   (c) fuel flow metering means for metering the fuel flow to the engine in response to the first and second fuel flow control signals; wherein the fuel control system further includes third speed-limiting failsafe control means adapted to monitor the temperature of the control system and take over control of fuel flow from the first and second electronic control means if the temperature exceeds a predetermined dangerous value.

3. A fuel control system according to claim 1 or claim 2 wherein the third control means comprises temperature-controlled electronic switching means and fuel flow restriction means, the electronic switching means being arranged to remove control of fuel flow from the first and second control means when the temperature of the control system exceeds said predetermined value and the fuel flow restriction means being adapted automatically to restrict the fuel flow to a low flow rate when said removal of control occurs, said low flow rate preventing overspeed of the engine from occuring at any condition of the engine.

4. A fuel control system according to claim 3, the electronic switching means comprising:
   temperature sensing means for generating a sensed temperature signal expressive of the temperature experienced by the switching means;
   temperature datum means for generating a datum temperature signal expressive of said predetermined value of temperature;
   comparator means for comparing the sensed temperature signal with the datum temperature signal and outputting a switching signal when the sensed temperature signal exceeds the datum temperature signal; and
   a semiconductor switching device connected to remove control of the fuel flow metering means from at least the first control means.

5. A fuel control system according to claim 3 wherein the fuel flow restriction means comprises spring bias means, valve means and associated valve stop means in the fuel flow metering means, the position of said valve means normally being controlled by the first electronic control means to control the flow through the fuel flow metering means, whereby when the electronic switching means removes control of said valve means from the first electronic control means, said valve means is automatically moved against said valve stop means by the spring bias means to establish said low flow rate.

6. A fuel control system according to claim 4 wherein the fuel flow restriction means comprises spring bias means, valve means and associated valve stop means in the fuel flow metering means, the position of said valve means normally being controlled by the first electronic control means to control the flow through the fuel flow metering means, whereby when the electronic switching means removes control of said valve means from the first electronic control means, said valve means is automatically moved against said valve stop means by the spring bias means to establish said low flow rate.

7. A fuel control system according to either of claims 1 or 2 wherein the first control means comprises a digital electronic controller for exercising a normal control mode comprising full authority digital control of the engine.

8. A fuel control system according to either of claims 1 or 2 wherein the second control means causes valve means in the fuel flow metering means to substantially cut off the flow of fuel to the engine when the engine overspeeds, said flow of fuel remaining substantially cut off until the engine speed falls below a predetermined safe value.

9. A fuel control system according to claim 1, wherein the first control means comprises components rated at a first (lower) peak operating temperature and the second and third control means comprise components rated at a second (higher) peak operating temperature, said predetermined value of temperature being slightly less than the second peak operating temperature.

* * * * *